J. N. SCHUREMAN.
Street-Sprinkler.

No. 226,119                     Patented Mar. 30, 1880.

Witnesses:
Warren Seely
Jas. B. Hammond

Inventor:
John N. Schureman
by Elec. Gear
Atty

UNITED STATES PATENT OFFICE.

JOHN N. SCHUREMAN, OF ST. LOUIS, MISSOURI.

STREET-SPRINKLER.

SPECIFICATION forming part of Letters Patent No. 226,119, dated March 30, 1880.

Application filed December 13, 1879.

*To all whom it may concern:*

Be it known that I, JOHN N. SCHUREMAN, of St. Louis, in the county of St. Louis and State of Missouri, have invented a new and useful Improvement in Street-Sprinklers; and I do hereby declare that the following is a full, clear, and exact description of the same.

My invention relates to street-sprinklers of that class in which a perforated pipe is carried in rear of the tank which contains the water, the flow of water therefrom being regulated by valves under the control of the driver.

It consists of certain details of construction, which are hereinafter fully set forth, and particularly pointed out in the claims.

Figure 1:
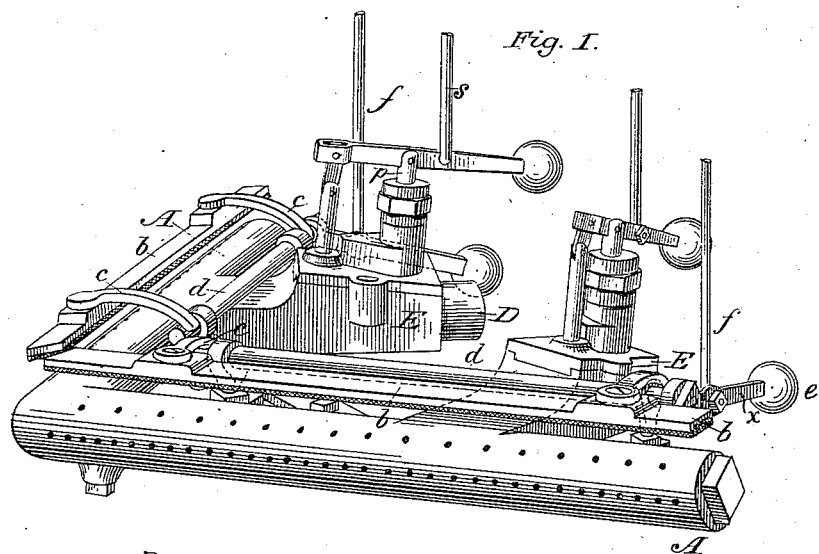
Figures 2, 3:
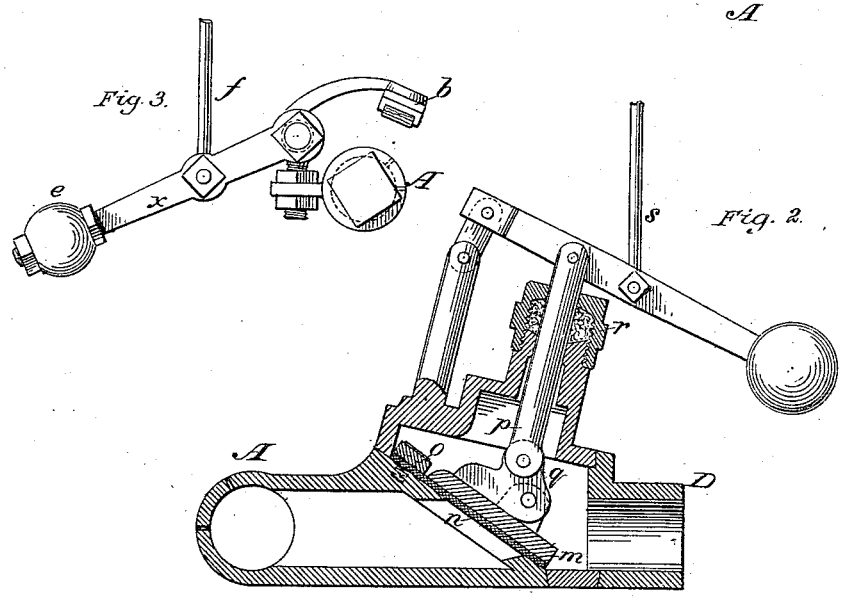
Figure 4:
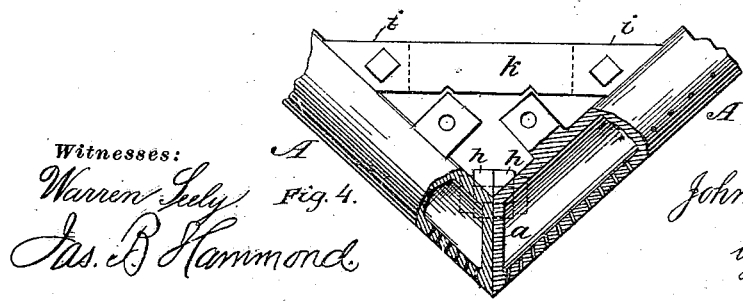

In the drawings hereunto attached, and forming part of this specification, Figure 1 shows a perspective view of the sprinkling apparatus. Fig. 2 represents a section taken transversely of the sprinkling-pipe on one side and longitudinally through the center of the pipe communicating with that side, showing the valve and valve-connections. Fig. 3 is a side elevation of the valve and weighted levers; and Fig. 4, a plan view of perforated pipe, partly broken away.

The object of that part of my invention first to be described is to regulate the amount of water which may be distributed upon the surface of the street, so that a full flow may be permitted on both sides or upon either, or the flow may be diminished upon either side or upon both.

In carrying out this part of my invention I make the distributing-pipe of two straight sections, which meet at a central point, forming an obtuse angle. These pipes are preferably separated from each other by a central partition, (shown at *a*, where the pipes A are broken away.)

The pipes A are perforated with two rows of holes, which holes are bored into the pipe divergent, so as to distribute the flow of water uniformly over the surface of the street.

Valves *b b* are arranged upon arms *c c*, connected to shaft *d*, which are supported in bearings upon the pipes A A. These valves are preferably made of metallic shell or half-tube, with a rubber packing having a surface of shape and extent suited to cover one row of holes. The valve is preferably so located as to cover the upper row of holes and stop the flow of water therefrom.

To one end of the shaft *d* an arm is fixed, extending inwardly, and provided with a weight, *e*. A rod, *f*, is pivoted to each one of these weighted arms, and may be connected suitably to a lever or some equivalent device within reach of the driver, by means of which he may at any time raise either one or both of the weighted arms and close either one or both of the valves.

The holes in the two rows being of the same size, by the closing of the valve or valves one-half the flow of water is shut off without diminishing the amount of surface to which the water is applied; but the number or size of the holes may be varied in the two rows to divide unequally the flow of water, if preferred.

By the arrangement described the amount of water delivered by the pipe may be diminished, or the diminution may be applied to one side only, as is sometimes desirable—as, for instance, where a walk is to be sprinkled upon one side.

It will be observed that the straight sections of the perforated pipe are specially adapted to receive the valve which closes one row of the holes. This form of the pipe is also convenient for another reason, relating solely to the manufacture of the apparatus.

After the holes are bored in the pipe the roughness of the inner surface may be removed in the straight pipe without any inconvenience, and the inner surface be left perfectly smooth, so as not to be liable to catch any fibrous material and become clogged thereby.

The two sections of the pipe A A may be conveniently connected by lugs *h h*, fitting together at the angle, and by lugs *i i*, connected by a bar, *k*. This pipe may also be provided with ordinary removable plugs for the purpose of cleaning when desired.

The second part of my invention relates to the construction of the valves by which the water is admitted to or cut off from the perforated distributing-pipe.

It will be observed that each section A A is provided with its independent supply-pipe D D. These pipes are provided with valve-chests too E E directly connected with and located near the pipe A A, so that the water may be quickly cut off from or admitted to the said pipes.

The valves are made of rectangular plates m m, having that surface next the seat faced with leather, as shown at n n. This leather facing may extend backward and be held by a clamp, o, so as to form the hinge of the valve.

The valve-seat is inclined, as shown in Fig. 2, the inclination being arranged so that the pressure of water tends to keep the valve closed. On the upper side of each valve are lugs, by means of which the valves are connected to rods p p through intermediate links, q q.

The rods p p slide vertically through stuffing-boxes r r, and these rods are connected to weighted levers of the second order, which are provided with lifting-rods s s. These rods may be connected to hand or foot levers within reach of the driver.

The arrangement is such that while the driver, by his hand or foot, holds the valve up the water is permitted to flow freely, but is automatically shut off by the removal of the hand or foot.

The links q q are made of a peculiar shape, as shown in Fig. 2, whereby they permit the rod to lift the valve when said rod is raised, and also serve, when the rod is depressed, to force the valve downward, the lower straight edge of the connecting-link coming in contact with the upper surface of the valve.

The entire apparatus may be suspended from the frame of the cart by lugs cast upon the outer ends of the pipes A A and by the transverse bar.

I am aware that water-guards sliding on rods and under control of the driver have been used in connection with the discharge-tube of a street-sprinkler, and I do not claim such construction.

Having thus described my invention, what I claim as new, and desire to secure by Letters Patent, is—

1. In combination with the perforated tube of a street-sprinkler, a hinged valve adapted to close upon and cut off the flow of water from such perforations, such valve being under control of the driver, as set forth.

2. In a street-sprinkler, and in combination with the sprinkling-tube, a pivoted valve provided with a counter-balance, substantially as and for the purpose set forth.

3. The valves b b, adapted to close upon the pipe A A, in combination with the shafts d, the weighted levers, and the lifting-rods, whereby the valves are automatically opened, as set forth.

4. In combination with the independent pipe-sections A A, the valve-chest directly connected thereto and provided with weighted valves, as set forth.

5. The hinged valves m, in combination with the vertical rods, connecting-links q q, and weighted levers, as set forth.

In testimony whereof I have signed my name to this specification in the presence of two subscribing witnesses.

JOHN N. SCHUREMAN.

Witnesses:
L. W. SEELY,
FRANK MIDDLETON.